(12) United States Patent
Okuno

(10) Patent No.: US 7,379,677 B2
(45) Date of Patent: May 27, 2008

(54) METHOD OF WAVELENGTH CONVERSION AND WAVELENGTH CONVERTER

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 558 days.

(21) Appl. No.: 11/042,334

(22) Filed: Jan. 26, 2005

(65) Prior Publication Data

US 2005/0207757 A1    Sep. 22, 2005

(30) Foreign Application Priority Data

Jan. 26, 2004   (JP) .............................. 2004-017416

(51) Int. Cl.
*H04B 10/02* (2006.01)

(52) U.S. Cl. .................. 398/176; 398/175; 398/152; 398/141; 398/158; 398/159; 398/157; 398/147; 398/148; 398/149; 398/150; 359/332; 359/326; 359/333; 359/344; 359/327; 359/328; 359/329; 385/1; 385/122; 385/123; 385/4; 385/5; 385/11; 385/14; 385/15

(58) Field of Classification Search ................ 398/175, 398/176, 152, 141, 157, 147, 158, 149, 150, 398/159, 148; 359/332, 326, 330, 327, 325, 359/320, 333, 328, 329, 344; 385/122, 123, 385/24, 11, 14, 1, 15
See application file for complete search history.

(56) References Cited

U.S. PATENT DOCUMENTS 6,043,927 A   3/2000 Islam 6,330,104 B1 * 12/2001 Kim et al. .................. 359/332
6,347,174 B1   2/2002 Onishi et al.
6,987,607 B2 *  1/2006 Watanabe .................... 359/332

FOREIGN PATENT DOCUMENTS

| JP | 2002-514322 | 5/2002 |
| JP | 2002-296630 | 10/2002 |
| WO | WO99/10770 | 3/1999 |

* cited by examiner

*Primary Examiner*—Hanh Phan
(74) *Attorney, Agent, or Firm*—McDermott Will & Emery LLP

(57) ABSTRACT

The wavelength converter comprises (1) an optical multiplexer for multiplexing an amplitude-modulated first light and reference light, which is continuous light having a wavelength different from the wavelength of the first light, (2) an optical fiber for propagating the multiplexed light therethrough to generate a third light by a non-linear optical phenomenon, and (3) an optical filter having a pass wavelength range set such that a pulse time width of the third light is 20% or more narrower than a pulse time width of the first light after the third light has passed through the optical filter, or (3') an optical filter having a pass wavelength range set such that a cross point of an eye pattern of the third light is lower than a cross point of an eye pattern of the first light after the third light has passed through the optical filter.

11 Claims, 12 Drawing Sheets

100ps

METHOD OF WAVELENGTH CONVERSION AND WAVELENGTH CONVERTER

BACKGROUND OF THE INVENTION

1. Field of the Invention

The present invention relates to a wavelength conversion method and a wavelength converter for outputting light having a wavelength different from that of an input light.

2. Related Background Art

A wavelength converter used in an optical communication network converts input signal light into signal light having a wavelength different from the wavelength of, but carrying the same information as, the input signal light, and outputs the converted signal light (e.g., PCT Laid-Open Pamphlet WO 99/10770, PCT Japanese Patent Application Publication No. 2002-514322, and Japanese Patent Application Publication No. 2002-296630). In a known wavelength converter, temporally amplitude-modulated input signal light and continuous light having larger power than the input signal light are multiplexed and propagated through an optical fiber so that output signal light having a wavelength different from the wavelength of the input signal light is generated by a non-linear optical phenomenon caused with such propagation, and is output.

In the known wavelength converter, continuous light is employed as pump light to cause the non-linear optical phenomenon in an optical fiber, and the larger the power of the continuous light, the better. However, since the continuous light has a narrow spectral line width of wavelength and has a low Stimulated Brillouin Scattering (SBS) threshold, the Brillouin scattering is more apt to occur, and the continuous light has a limit in power capable of being input to the optical fiber. As a result, there is also a limit in the power of output signal light obtained by the wavelength conversion.

For avoiding the occurrence of Brillouin scattering, there are known methods such as phase-modulating or dithering of the continuous light which is the pump light. However, solution by such methods needs a large-sized wavelength converter and results in increase of cost.

SUMMARY OF THE INVENTION

An object of the present invention is to provide a wavelength conversion method and a wavelength converter capable of performing wavelength conversion with high efficiency using a simple construction.

To achieve the above object, the present invention provides a wavelength conversion method in which an amplitude-modulated first light is input and a second light having a wavelength different from the wavelength of the first light is output. The method comprises the steps of (1) multiplexing the first light and reference light that is continuous light having a wavelength different from the wavelength of the first light, and (2) propagating the multiplexed first light and reference light through an optical fiber so as to generate a third light having a wavelength different from the wavelength of the first light by means of a non-linear optical phenomenon. Subsequent to those steps, the method further comprises the step of (3) causing the third light to pass through an optical filter in which the pass wavelength range is set such that the pulse time width of the third light is 20% or more narrower than the pulse time width of the first light after such passage through the optical filter, or (3') causing the third light to pass through an optical filter in which the pass wavelength range is set such that a cross point of an eye pattern of the third light is lower than a cross point of an eye pattern of the first light after such passage through the optical filter, thereby obtaining a second light.

To achieve the above object, another aspect of the present invention provides a wavelength converter which receives an amplitude-modulated first light and outputs a second light having a wavelength different from the wavelength of the first light. The converter comprises (1) an optical multiplexer for multiplexing the first light and reference light that is continuous light having a wavelength different from the wavelength of the first light, and (2) an optical fiber for propagating the multiplexed first light and the reference light therethrough so as to generate a third light having a wavelength different from the wavelength of the first light by means of a non-linear optical phenomenon. In addition, the converter further comprises (3) an optical filter allowing the third light to pass therethrough and having a pass wavelength range that is set such that the pulse time width of the third light is 20% or more narrower than the pulse time width of the first light after such passage through the optical filter, or (3') an optical filter allowing the third light to pass therethrough and having a pass wavelength range which is set such that the cross point of the third light eye pattern is lower than the cross point of the first light eye pattern after such passage through the optical filter.

DETAILED DESCRIPTION OF THE INVENTION

The present invention will be described in detail below with reference to the drawings. The drawings are given only by way of explanation, and are not intended to limit the scope of the invention.

Figure 1:
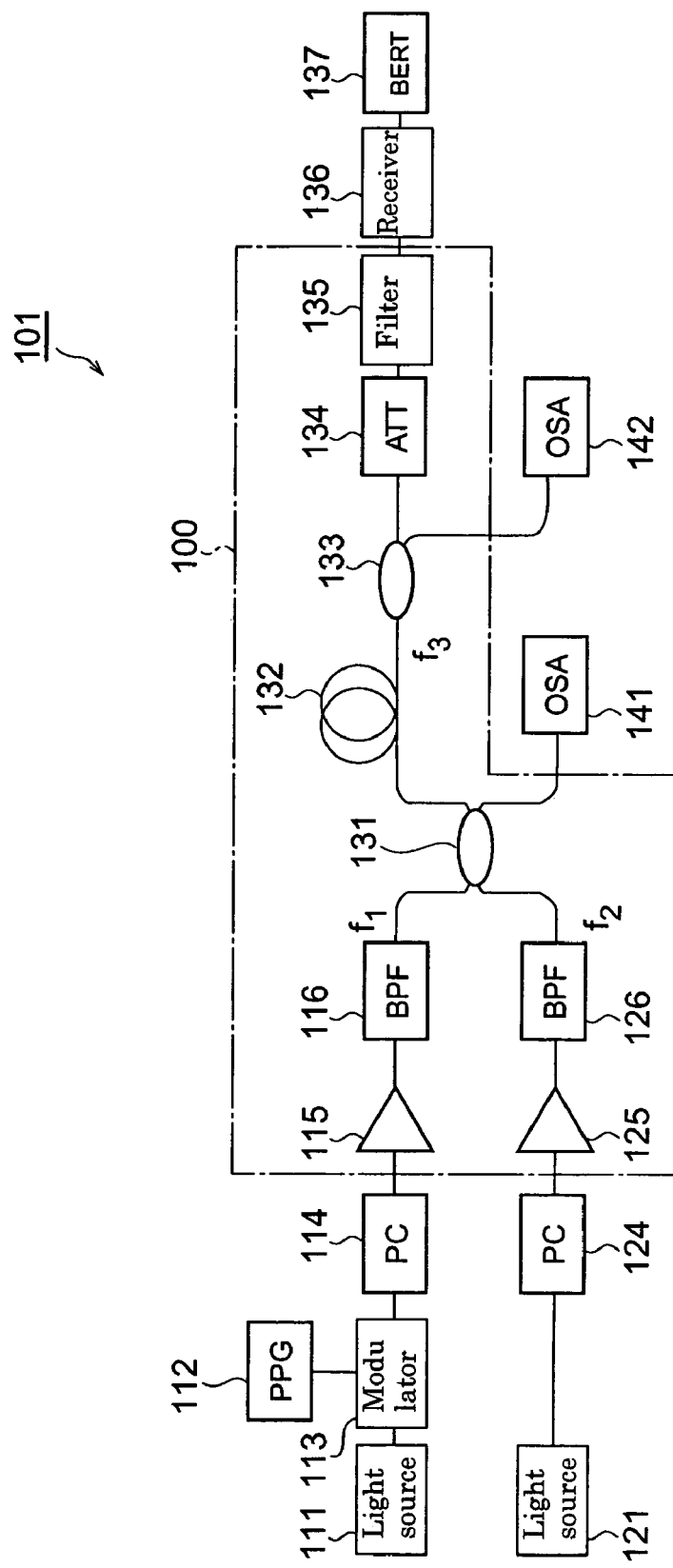
FIG. 1 is a schematic diagram illustrating a wavelength converter according to an embodiment of the present invention and a wavelength converter evaluation system including it.

FIG. 1 is a schematic diagram of an embodiment of a wavelength converter of the present invention and a wavelength converter evaluation system including it. A wavelength converter 100 comprises an Erbium-Doped Fiber Amplifier (EDFA) 115, a band-pass filter 116, an EDFA 125, a band-pass filter 126, a 3-dB optical coupler 131, an optical fiber 132, an optical coupler 133, a variable optical attenuator 134, and an optical filter 135. A wavelength converter evaluation system 101 is to evaluate the wavelength converter 100 and comprises, in addition to the wavelength converter 100, a light source 111, a pulse pattern generator 112, a modulator 113, a polarization controller 114, a light source 121, a polarization controller 124, a receiver 136, a bit error rate evaluator 137, an optical spectrum analyzer 141, and an optical spectrum analyzer 142.

The light source 111, which for example, preferably is a semiconductor laser beam source, outputs continuous light. The pulse pattern generator 112 outputs an electrical signal which has been amplitude-modulated in a predetermined pattern. The modulator 113 receives not only the continuous light output from the light source 111, but also the electrical signal output from the pulse pattern generator 112. Then, the modulator 113 modulates the amplitude of the continuous light in accordance with the electrical signal and outputs the modulated continuous light. The polarization controller 114 receives the light output from the modulator 113, adjusts the polarized state of the received light, and outputs the adjusted light.

The EDFA 115 receives the light output from the polarization controller 114 and outputs it after performing light amplification. The band-pass filter 116 receives the light output from the EDFA 115, selectively allows passage of light (first light) having an optical frequency $f_1$ among the received light, and outputs the passed light. The output wavelength of the light source 111 is preferably variable, and the pass wavelength (optical frequency $f_1$) of the band-pass filter 116 is also preferably variable, preferably both with a variable width of not smaller than 10 nm. If the wavelength of the first light is variable, an arbitrary wavelength in wavelength multiplex transmission can be handled without replacing the converter, and a degree of flexibility can be increased.

The light source 121, which outputs continuous light, is preferably a semiconductor laser beam source, for example. The polarization controller 124 receives the light output from the light source 121, adjusts the polarized state of the received light, and outputs the adjusted light. The EDFA 125 receives the light output from the polarization controller 124 and outputs it after performing light amplification. The band-pass filter 126 receives the light output from the EDFA 125, and out of the received light, selectively allows passage of light having an optical frequency $f_2$ that differs from the optical fiber frequency $f_1$, and outputs the passed light in the form of a continuous light as a reference light. The output wavelength of the light source 121 is preferably variable, and the passage wavelength (optical frequency $f_2$) of the band-pass filter 126 is also preferably variable. If the wavelength of the reference light is variable, the first light can be converted into light of an arbitrary wavelength.

The 3-dB optical coupler 131 receives the first light at one input port and outputs the received light from the two output ports, branching the received light into two parts. Also, the 3-dB optical coupler 131 receives the reference light at the other input port, and outputs the received light from the two output ports, branching the received light into two parts. One output port of the 3-dB optical coupler 131 is connected to the optical fiber 132, and the other output port thereof is connected to the optical spectrum analyzer 141.

The optical fiber 132 receives the first light of optical frequency $f_1$ and the reference light of optical frequency $f_2$, both of which have been output from the one output port of the 3-dB optical coupler 131. Thus, the two types of light propagate through the optical fiber 132. Thus, a third light containing light of optical frequency $f_3$ is generated by means of a non-linear optical phenomenon (four-wave mixing) caused with such propagation of light, and is out put from the optical fiber 132. The optical frequency $f_3$ differs from both of the optical frequency $f_1$ and the optical frequency $f_2$.

Here, in order to cause a non-linear optical phenomenon in the optical fiber 132 with high efficiency, the absolute value of wavelength dispersion of the optical fiber 132 is preferably not larger than 0.2 ps/nm/km at the frequency $f_1$ of the first light. With such condition, a wavelength conversion to a desired wavelength is possible in the range of 10 nm or more bandwidth. Also, the non-linear coefficient of the optical fiber 132 is preferably not smaller than 10/W/km. Such condition allows high conversion efficiency and hence a shortened length of optical fiber. Furthermore, the dispersion slope of the optical fiber 132 is preferably 0 at a wavelength within the C band or L band in order to cause the non-linear optical phenomenon in the optical fiber 132 with high efficiency even when the frequencies $f_1$, $f_2$ are changed.

A highly non-linear optical fiber or a highly non-linear dispersion flat optical fiber is preferably used as the optical fiber 132 having such properties. By using such an optical fiber, the wavelength of any light within the assumed band can be converted with substantially constant efficiency.

The optical coupler 133 receives the light output from the optical fiber 132, and outputs a branched part of the received light to the optical spectrum analyzer 142 and the remaining part to the variable optical attenuator 134. The variable optical attenuator 134 receives the light output from the optical coupler 133 and having reached it, attenuates the received light, and outputs the attenuated light.

The optical filter 135 receives the light output from the variable optical attenuator 134, selectively allows passage of the light of optical frequency $f_3$ among the received light, and outputs the passed light as a second light. The optical filter has such characteristics as allow the second light to have a pulse width 20% or more narrower than the pulse width of the first light, or allow an eye pattern of the second light to have a cross point lower than the cross point of an eye pattern of the first light.

In the case where the optical frequency $f_1$ or the optical frequency $f_2$ is variable, the optical filter 135 is preferably a wavelength variable optical filter, and the pass wavelength range thereof is preferably adjustable by 10 nm or more with the wavelength shift control. The wavelength shift control may be performed based on a wavelength shift of the reference light, or based on a wavelength shift of the first light. In these cases, even when the wavelength of the third light is changed, the second light can be taken out following the wavelength change of the third light. Further, an arbitrary wavelength can be handled in wavelength multiplex transmission without replacing the converter, and a degree of flexibility can be increased.

In addition, the output power variation in the wavelength shift control of pass wavelength to be output from the optical filter is preferably not larger than 3 dB. With this condition, the effect of a power variation in conversion into a desired wavelength upon the transmission system can be held down to a level not problematic from the practical point of view. That condition can be realized, for example, with a technique of suppressing dispersion characteristics of the fiber, or adding an optical amplifier.

The receiver 136 receives the second light of optical frequency $f_3$ that has passed through the optical filter 135, and outputs a voltage value corresponding to the amplitude of the received light. The bit error rate evaluator 137 receives a voltage signal output from the receiver 136, and evaluates a bit error rate at the time of reception by the receiver 136 in accordance with the voltage signal.

The optical spectrum analyzer 141 receives the light output from the 3-dB optical coupler 131 and having reached it, and measures the spectrum of the received light. The optical spectrum analyzer 142 receives the light output from the optical coupler 133 and having reached it, and measures the spectrum of the received light. Instead of the optical spectrum analyzer 141, an oscilloscope may be provided to measure the waveform of the light output from the 3-dB optical coupler 131 and having reached it. Also, instead of the optical spectrum analyzer 142, an oscilloscope may be provided to measure the waveform of the light output from the optical coupler 133 and having reached it.

The wavelength converter 100 and the wavelength converter evaluation system 101 operate as follows. The continuous light output from the light source 111 is amplitude-modulated by the modulator 113 in accordance with the electrical signal output from the pulse pattern generator 112. The amplitude-modulated light is brought into a predetermined polarized state by the polarization controller 114 and is amplified by the EDFA 115. Of the light thus amplified, the first light of optical frequency $f_1$ selectively passes through the band-pass filter 116 and enters the one input port of the 3-dB optical coupler 131. Note that when the power of the first light input to the wavelength converter 100 is sufficiently high, the EDFA 115 is not required. Also, when the optical SN ratio of the first light input to the optical fiber 132 is sufficiently high, the band-pass filter 116 is not required.

The continuous light output from the light source 121 is brought into a predetermined polarized state by the polarization controller 124 and is amplified by the EDFA 125. Of the light thus amplified, the reference light of optical frequency $f_2$ that is continuous light selectively passes through the band-pass filter 126 and enters the other input port of the 3-dB optical coupler 131. Note that when the power of the reference light input to the wavelength converter 100 is sufficiently high, the EDFA 125 is not required. Also, when the optical SN ratio of the reference light input to the optical fiber 132 is sufficiently high, the band-pass filter 126 is not required.

The first light and the reference light that have been input to the 3-dB optical coupler 131 are multiplexed by the 3-dB optical coupler 131 and then branched into two parts so as to be output from the two output ports thereof. The first light of optical frequency $f_1$ and the reference light of optical frequency $f_2$ that have been output from the one output port of the 3-dB optical coupler 131 are input to one end of the optical fiber 132 and propagate through it toward the other end. The third light containing light of optical frequency $f_3$ is generated in the optical fiber 132 as a result of the non-linear optical phenomenon caused with such propagation of light.

The third light output from the optical fiber 132 is attenuated by the variable optical attenuator 134 so as to have predetermined power, and is input to the optical filter 135. Of the light input to the optical filter 135, the second light of optical frequency $f_3$ selectively passes through the optical filter 135 and is received by the receiver 136. Then, the bit error rate evaluator 137 evaluates a bit error rate at the time of reception by the receiver 136.

Figure 2:
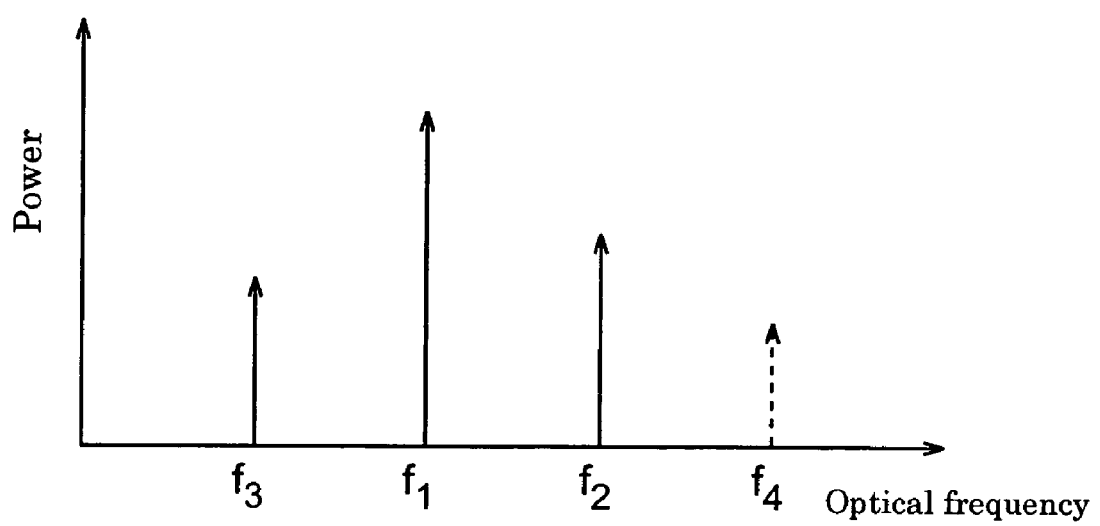
FIG. 2 is a graph showing locations of respective optical frequencies $f_1$, $f_2$, and $f_3$ of a first light, a reference light, and a second light in a wavelength conversion method of the present invention.

FIG. 2 is a graph showing locations of the respective optical frequencies $f_1$, $f_2$, and $f_3$ of the first light, the reference light, and the second light according to the wavelength conversion method of the present invention. The wavelength converter 100 is set such that the power of the reference light having an optical frequency $f_2$ and input as the continuous light to the optical fiber 132 is smaller than the power of the amplitude-modulated first light having the optical frequency $f_1$ and input to the optical fiber 132. Such setting can be made by properly adjusting the respective output light amplitudes of the light sources 111 and 121, as well as the respective gains of the EDFA 115 and the EDFA 125.

Since the amplitude of the first light of optical frequency $f_1$ and the amplitude of the reference light of optical frequency $f_2$ have the relationship described above, the optical frequency $f_3$ of the third light generated in the optical fiber 132 is expressed by a formula "$f_3=2f_1-f_2$". On the other hand, when the power of the reference light of optical frequency $f_2$ is larger than the power of the first light of optical frequency $f_1$ (this case will be referred to as a "reference example"), light having an optical frequency $f_4$ ($f_4=2f_2-f_1$), as indicated by a broken line in FIG. 2, is generated.

In this embodiment, the construction of the wavelength converter 100 can be simplified because no additional means for suppressing SBS is required since the amplitude of the reference light in the form of a continuous light is relatively small and the SBS threshold is high. Also, the wavelength conversion efficiency can be improved. The power of the third light of optical frequency $f_3$ that is obtained through the wavelength conversion depends on the power of the reference light of optical frequency $f_2$. However, since the power of the reference light is not required to be so large, highly efficient wavelength conversion can be realized. Further, if the optical frequency $f_2$ of the reference light to be input to the optical fiber 132 is variable, the optical frequency $f_3$ of the light obtained through the wavelength conversion can also be made variable.

When the optical frequency $f_3$ is kept fixed, an ordinary highly non-linear optical fiber having the highest wavelength conversion efficiency is preferably used as the optical fiber 132 since no shortage of conversion range occurs. On the other hand, when the optical frequency $f_3$ is variable, it is preferable to use, as the optical fiber 132, a highly non-linear dispersion flat optical fiber that is capable of performing the wavelength conversion over a wide wavelength range.

Figure 3:
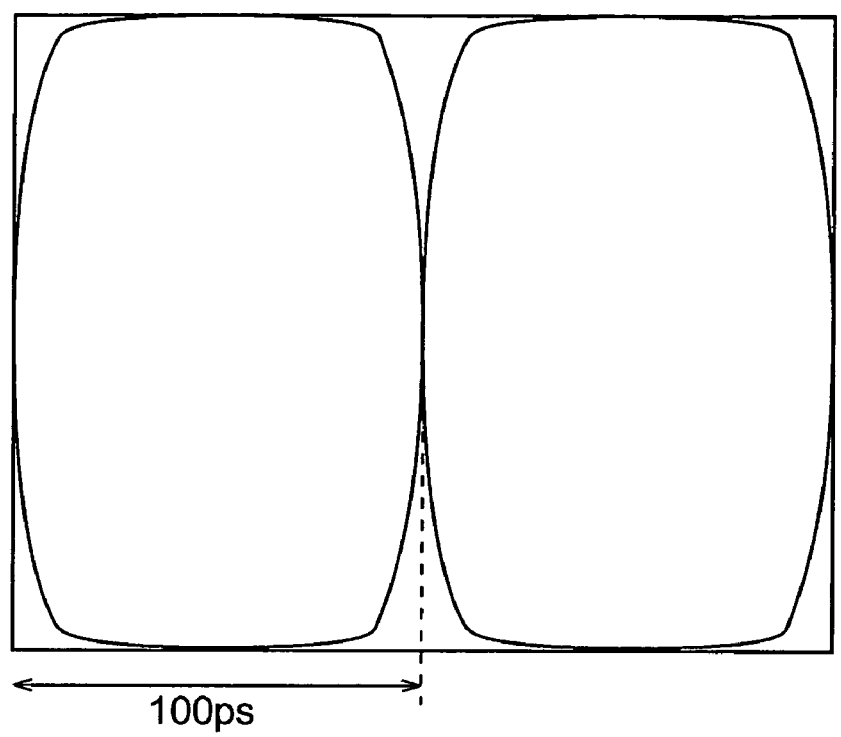
FIG. 3A is a graph showing an eye pattern of the first light output from a band-pass filter in the wavelength converter of FIG. 1.
FIG. 3B is a graph showing a spectrum of the first light.
Figure 3B:
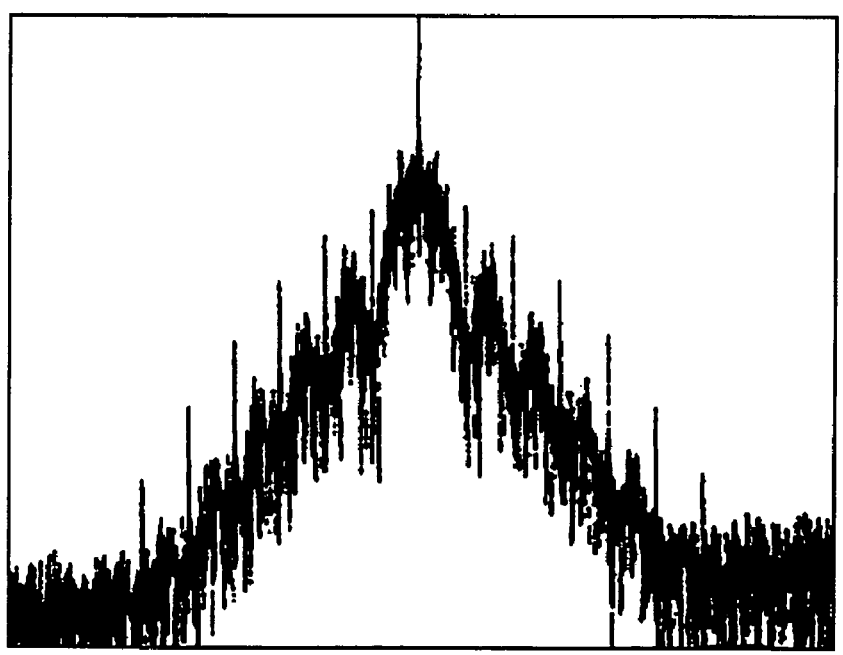
Figure 4A:
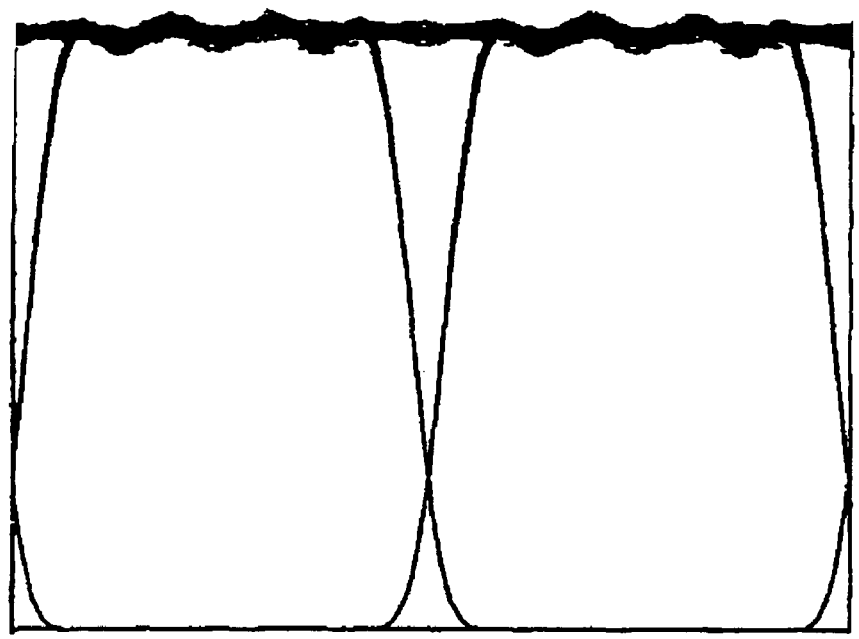
FIG. 4A is a graph showing an eye pattern of the second light received by a receiver in the wavelength converter evaluation system of FIG. 1.
Figure 4B:
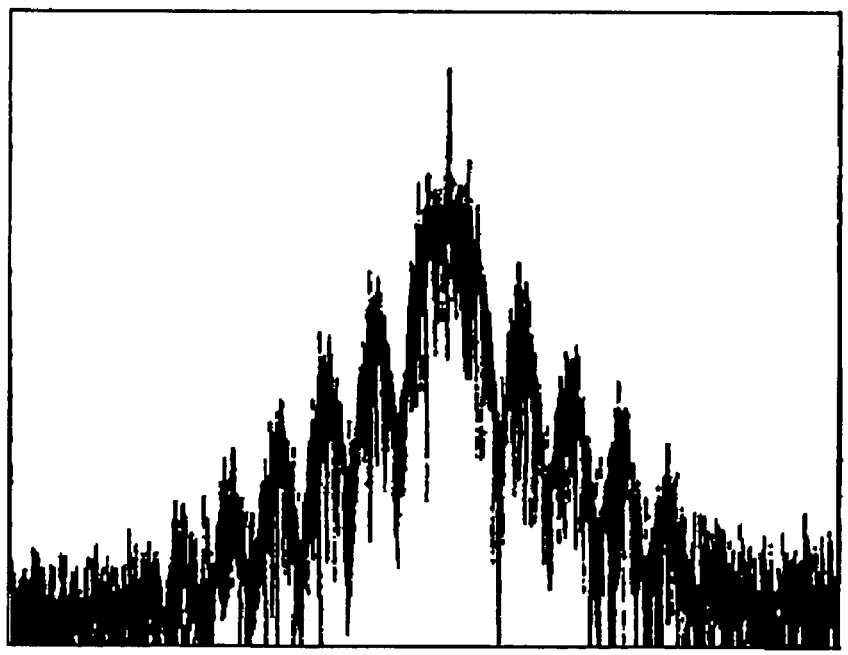
FIG. 4B is a graph showing a spectrum of the second light.
Figure 5A:
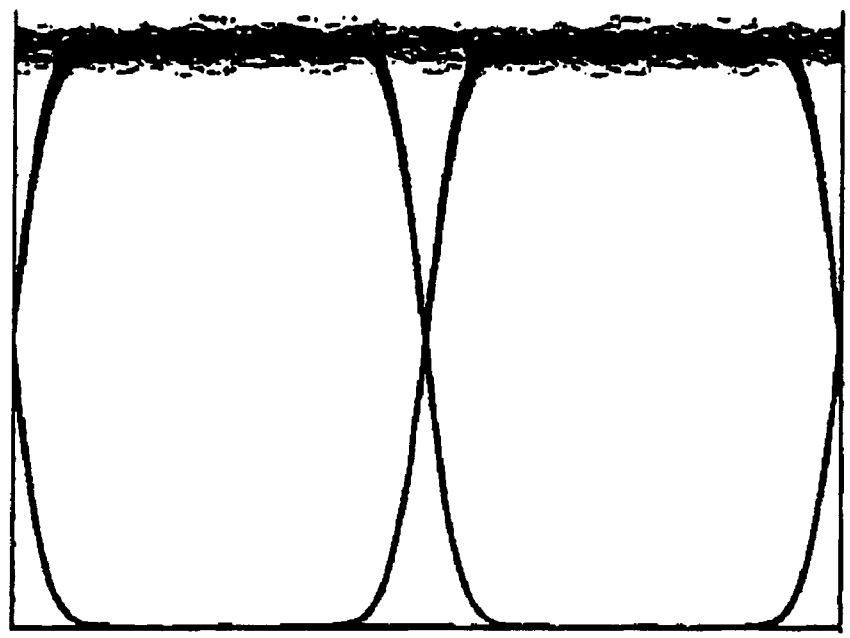
FIG. 5A is a graph showing an eye pattern of light having an optical frequency $f_4$ and received by a receiver in a wavelength converter as a reference example.
Figure 5B:
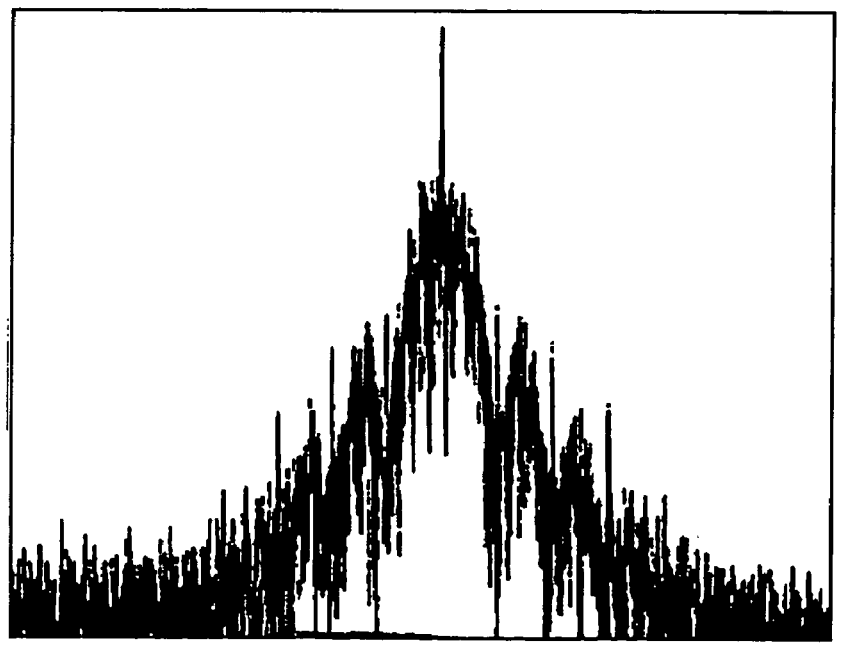
FIG. 5B is a graph showing a spectrum of that light.

FIG. 3A is a graph showing an eye pattern of the first light output from the band-pass filter 116 in the wavelength converter 100, and FIG. 3B is a graph showing a spectrum of the first light. FIG. 4A is a graph showing an eye pattern of the second light received by the receiver 136 in the wavelength converter evaluation system 101, and FIG. 4B is a graph showing a spectrum of the second light. FIG. 5A is a graph showing an eye pattern of the light having the optical frequency $f_4$ and received by a receiver in a wavelength converter as the reference example, and FIG. 5B is a graph showing a spectrum of that light.

As shown in those drawings, a cross point appearing in the eye pattern of the first light of optical frequency $f_1$ is positioned nearly a midpoint between a high level and a low level, while a cross point appearing in the eye pattern of the second light of optical frequency $f_3$ is positioned below the midpoint. In other words, the second light has a waveform resulting from effectively shaping the waveform of the first light. This is because the power of the second light is proportional to the square of the power of the first light.

Figure 6:
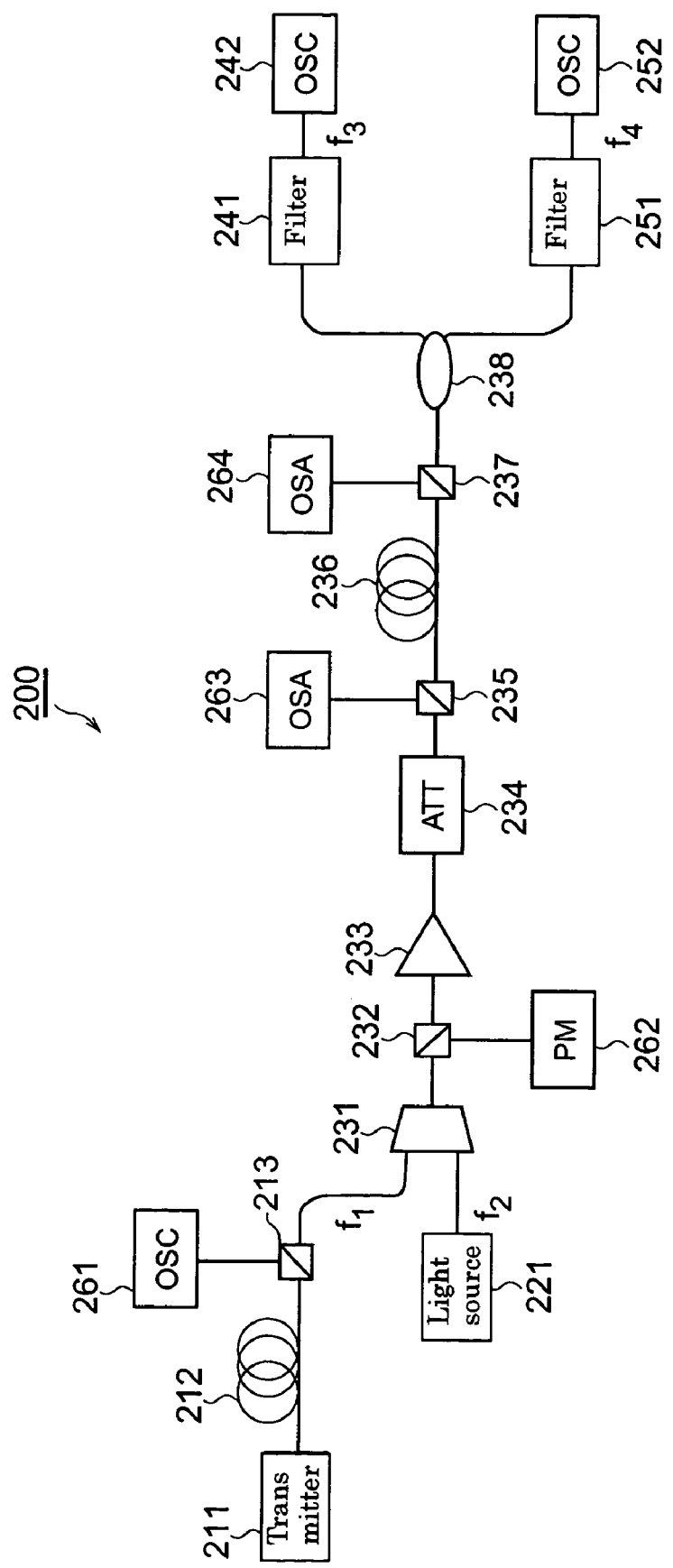
FIG. 6 is a schematic diagram of a wavelength converter according to an embodiment of the present invention.

FIG. 6 is a schematic diagram of an embodiment of a wavelength converter of the present invention. The following description is made based on the result of simulation carried out using the wavelength converter of this embodiment. A wavelength converter 200 comprises a transmitter 211, an optical fiber 212, an optical coupler 213, a light source 221, an optical multiplexer 231, an optical coupler 232, an EDFA 233, a variable optical attenuator 234, an optical coupler 235, an optical fiber 236, an optical coupler 237, a 3-dB optical coupler 238, an optical filter 241, an oscilloscope 242, an optical filter 251, an oscilloscope 252, an oscilloscope 261, a power monitor 262, an optical spectrum analyzer 263, and an optical spectrum analyzer 264.

The transmitter 211 outputs a Gaussian RZ pulsed light with a pulse width of 10 ps. The amplitude-modulated light output from the transmitter 211 has a bit rate of 40 Gb/s, an optical frequency $f_1$ of 194.04 THz, and output power of 0 dBm. The optical fiber 212 is a standard single-mode optical fiber and allows the light output from the transmitter 211 to propagate through it while giving a waveform distortion to the propagating light. A degree of the waveform distortion is adjusted by selecting the length of the optical fiber 212. The optical coupler 213 branches a part of the light output from the optical fiber 212, outputting the branched part to the oscilloscope 261 and outputting the remaining part, as the first light, to the optical multiplexer 231.

The light source 221 outputs, as a reference light, a continuous light having an optical frequency $f_2$ of 194.5 THz. The continuous light output from the light source 221 has power of 0 dBm. The optical multiplexer 231 receives and multiplexes the amplitude-modulated first light of optical frequency $f_1$, which has been output from the optical coupler 213, and the reference light of optical frequency $f_2$, which has been output as the continuous light from the light source 221, and then outputs the multiplexed light to the optical coupler 232.

The optical coupler 232 branches a part of the light output from the optical multiplexer 231 so as to output the branched part to the power monitor 262 and the remaining part to the EDFA 233. The EDFA 233 amplifies the light having reached from the optical coupler 232 and outputs the amplified light. The variable optical attenuator 234 adjusts the power of the amplified light and outputs the attenuated light. The optical coupler 235 branches a part of the light output from the variable optical attenuator 234 so as to output the branched part to the optical spectrum analyzer 263 and the remaining part to the optical fiber 236.

The optical fiber 236 is a highly non-linear optical fiber and receives the amplitude-modulated first light of optical frequency $f_1$ and the reference light of optical frequency $f_2$ in the form of a continuous light, which have been multiplexed together, and allows the multiplexed light to propagate therethrough, thereby generating light of optical frequency $f_3$ and light of optical frequency $f_4$ by means of a non-linear optical phenomenon caused with such propagation of light, and outputs the light thus generated. The optical fiber 236 used herein has a length of 500 m, a transmission loss of 0.5 dB/km at the wavelength of 1545 nm, wavelength dispersion of 0 ps/nm/km at the wavelength of 1545 nm, a dispersion slope of 0.03 ps/nm$^2$/km at the wavelength of 1545 nm, a non-linear coefficient (XPM method) of $5.2 \times 10^{-20}$ m$^2$/W at the wavelength of 1545 nm, and an effective core area of 9 μm$^2$ at the wavelength of 1545 nm.

The optical coupler 237 branches a part of the light output from the optical fiber 236 and outputs the branched part to the optical spectrum analyzer 264, whereas it outputs the remaining part to the 3-dB optical coupler 238. The 3-dB optical coupler 238 branches the light having reached from the optical coupler 237 and outputs the light to the optical filter 241 and optical filter 251.

The optical filter 241 selectively allows passage of the light of optical frequency $f_3$ among the light having reached from the 3 dB optical coupler 238, and the oscilloscope 242 measures the shape of the light of optical frequency $f_3$ having passed through the optical filter 241. The optical filter 251 selectively allows passages of the light of optical frequency $f_4$ among the light having reached from the optical coupler 238, and the oscilloscope 252 measures the shape of the light of optical frequency $f_4$ having passed through the optical filter 251.

The oscilloscope 261 measures the shape of the light of optical frequency $f_1$ having reached from the optical coupler 213. The power monitor 262 monitors the power of the light having reached from the optical coupler 232. The optical spectrum analyzer 263 measures the spectrum of the light having reached from the optical coupler 235. Also, the optical spectrum analyzer 264 measures the spectrum of the light having reached from the optical coupler 237.

By using a wavelength converter 200 of this embodiment, the shape of the first light of optical frequency $f_1$ observed by the oscilloscope 261, the shape of the second light of optical frequency $f_3$ observed by the oscilloscope 242, and the shape of the light of optical frequency $f_4$ observed by the oscilloscope 252 were examined in the cases where the length of the optical fiber 212 was set to 0 km, 1 km, 2 km, 3 km, 4 km, and 5 km.

FIGS. 7A through 7F are graphs showing eye patterns of the first light measured by the oscilloscope 261 in the wavelength converter of the embodiment. The graphs of FIGS. 7A through 7F represent the cases where the optical fiber 212 has a length of 0 km, 1 km, 2 km, 3 km, 4 km, and 5 km, respectively.

FIGS. 8A through 8F are graphs showing eye patterns of the second light measured by the oscilloscope 242 in the wavelength converter of the embodiment. The graphs of FIGS. 8A through 8F represent the cases where the optical fiber 212 has a length of 0 km, 1 km, 2 km, 3 km, 4 km, and 5 km, respectively.

FIGS. 9A through 9F are graphs showing eye patterns of the light having the optical frequency $f_4$ and measured by the oscilloscope 252 in the wavelength converter of the embodiment. The graphs of FIGS. 9A through 9F represent the cases where the optical fiber 212 has a length of 0 km, 1 km, 2 km, 3 km, 4 km, and 5 km, respectively.

Figure 7A:
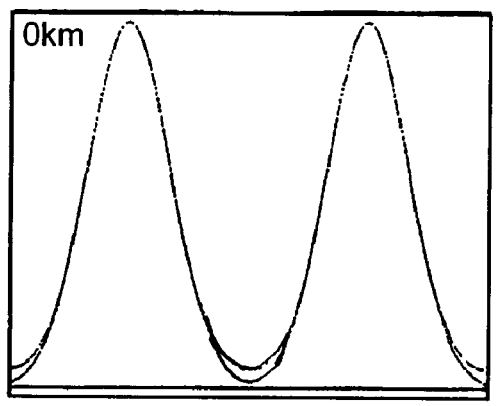
FIGS. 7A through 7F are graphs showing eye patterns of the first light measured by an oscilloscope 261 in a wavelength converter according to an embodiment of the present invention. The graphs of FIGS. 7A through 7F represent the cases where an optical fiber 212 has a length of 0 km, 1 km, 2 km, 3 km, 4 km, and 5 km, respectively.
Figure 7B:
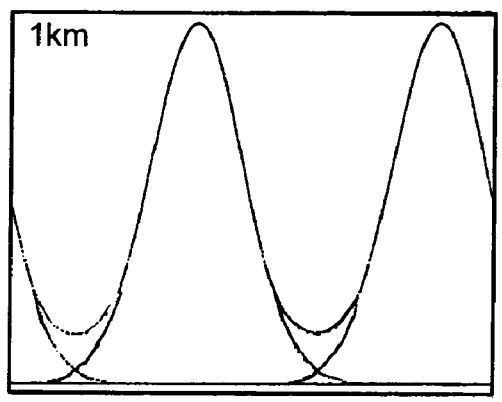
Figure 7C:
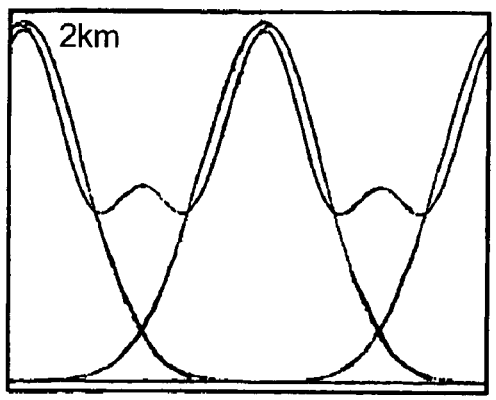
Figure 7D:
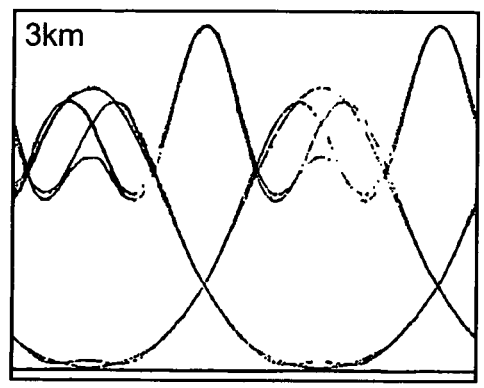
Figure 7E:
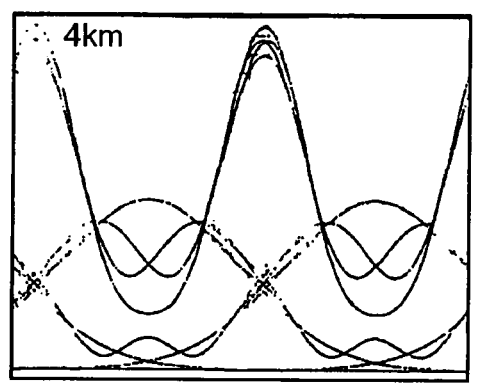
Figure 7F:
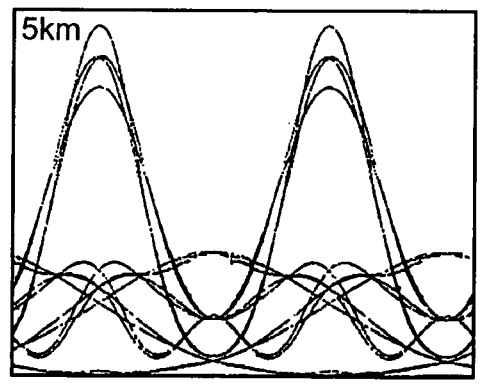
Figure 8A:
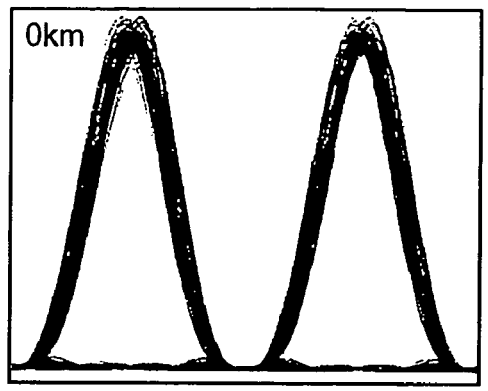
FIGS. 8A through 8F are graphs showing eye patterns of the second light measured by an oscilloscope 242 in a wavelength converter according to an embodiment of the invention. The graphs of FIGS. 8A through 8F represent the cases where an optical fiber 212 has a length of 0 km, 1 km, 2 km, 3 km, 4 km, and 5 km, respectively.
Figure 8B:
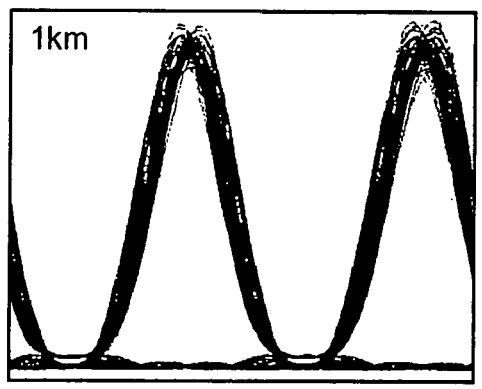
Figure 8C:
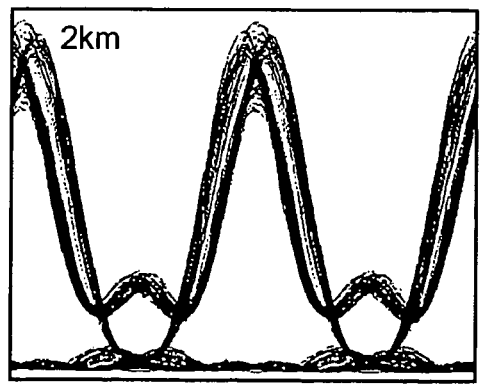
Figure 8D:
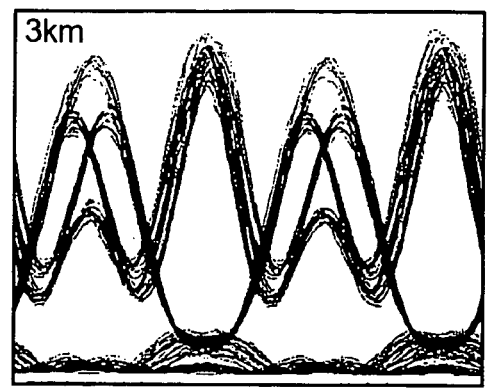
Figure 8E:
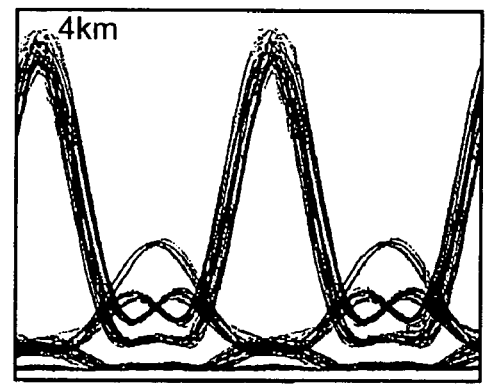
Figure 8F:
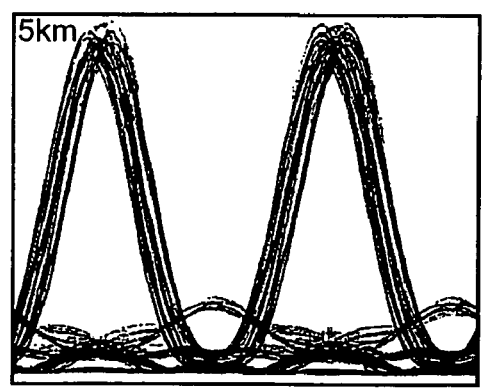
Figure 9A:
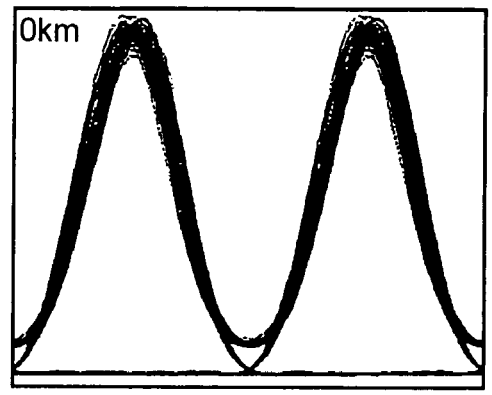
FIGS. 9A through 9F are graphs showing eye patterns of the light having an optical frequency $f_4$ and measured by an oscilloscope 252 in a wavelength converter of an embodiment of the invention. The graphs of FIGS. 9A through 9F represent the cases where the optical fiber 212 has a length of 0 km, 1 km, 2 km, 3 km, 4 km, and 5 km, respectively.
Figure 9B:
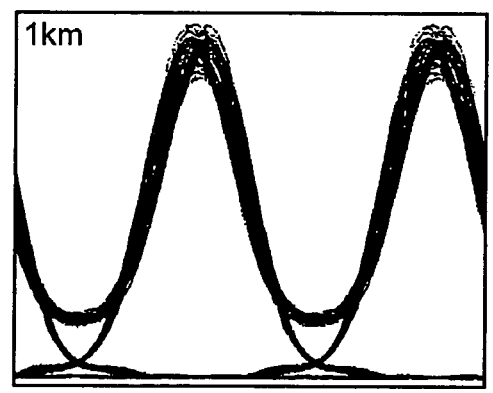
Figure 9C:
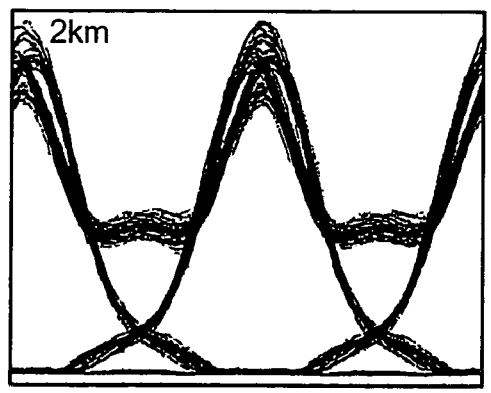
Figure 9D:
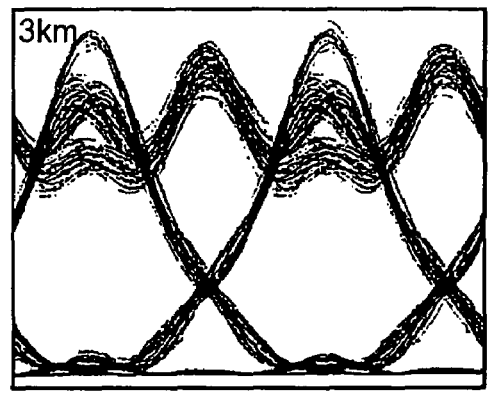
Figure 9E:
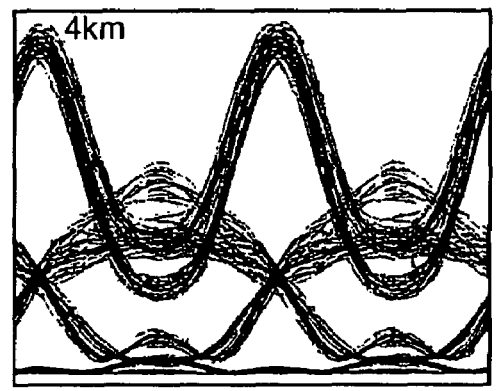
Figure 9F:
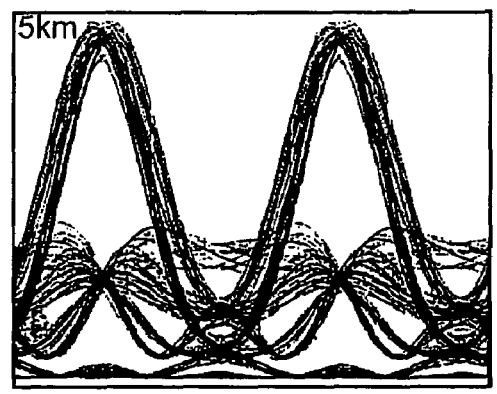

Comparing the eye pattern of the light of optical frequency $f_4$ shown in FIG. 9C and the eye pattern of the first light of optical frequency $f_1$ shown in FIG. 7C, their waveform distortions are comparable or slightly advanced. However, comparing the eye pattern of the second light of optical frequency $f_3$ shown in FIG. 8C with the eye pattern of the first light, it is found that the cross points are lowered, the noises at a zero level are reduced, and the waveforms are improved.

An optical fiber preferably used as the optical fiber 132 in the wavelength converter 100 will be described below. Table lists characteristics of each of optical fibers A through E that are preferably used as the optical fiber 132 in the wavelength converter 100. The values of the transmission loss, the wavelength dispersion, the dispersion slope, the effective core area, the non-linear coefficient by Cross Phase Modulation (XPM) method, the non-linear coefficient by Self Phase Modulation (SPM) method, and the polarization mode dispersion are those at the wavelength of 1550 nm.

TABLE

|  | Fiber A | Fiber B | Fiber C | Fiber D | Fiber E |
|---|---|---|---|---|---|
| Length m | 1000 | 500 | 1000 | 1000 | 1000 |
| Transmission loss dB/km | 0.47 | 0.62 | 0.46 | 0.56 | 0.22 |
| Chromatic dispersion ps/nm/km | 0.42 | 0.063 | 0.35 | −0.36 | 0.32 |
| Dispersion slope ps/nm²/km | 0.0002 | −0.0011 | −0.0001 | 0.025 | 0.0036 |
| Cutoff wavelength nm | 999 | 989 | 989 | 1473 | 915 |
| Effective core area μm² | 16.5 | 16.4 | 16.5 | 103 | 27.6 |
| Non-linear coefficient (XPM method)/W/km | 10.4 | 10.4 | 10.4 | 21 | 5.1 |
| Non-linear coefficient (SPM method)/W/km | 6.9 | 6.9 | 6.9 | 14 | 3.4 |
| Polarization mode dispersion ps/√km | 0.05 | 0.05 | 0.08 | 0.09 | 0.04 |

In addition to the optical fibers A through E, holey fibers are suitable for the optical fiber 132 in the wavelength converter 100. In particular, a holey fiber having a non-linear coefficient of not smaller than 20/W/km at the wavelength of 1550 nm or a transmission loss of not larger than 10 dB/km at the wavelength of 1550 nm is preferably used.

A dispersion shift optical fiber or a highly non-linear dispersion tapered optical fiber can also be preferably used as the optical fiber 132. The dispersion tapered optical fiber is an optical fiber manufactured intentionally changing its wavelength dispersion in the lengthwise direction, monotonously increasing in the lengthwise direction, or monotonously decreasing in the lengthwise direction, or repeating alternate increase and decrease in the lengthwise direction.

Further, if a fiber having substantially flat wavelength dependency of the wavelength dispersion like the optical fibers A through C is used as the optical fiber 132, the tolerance with respect to the wavelength of light input to the optical fiber 132 is increased, which is expected to result in realization of variable wavelength conversion. In this case, it is important that the wavelength dispersion be substantially zero.

This specification incorporates all disclosures of Japanese Patent Application No. 2004-017416 (filed Jan. 16, 2004), including specification, claims, drawings, and abstract.

What is claimed is:

1. A wavelength conversion method in which an amplitude-modulated first light having an optical frequency $f_1$ is received and a second light having a wavelength different from a wavelength of the first light is output, the method comprising the steps of:
    multiplexing the first light and a reference light, the reference light being a continuous light having a wavelength different from the wavelength of the first light and having an optical frequency $f_2$ and the first light having larger amplitude than the reference light;
    propagating the multiplexed first light and reference light through an optical fiber so as to generate a third light having a wavelength different from the wavelength of the first light and an optical frequency $f_3$, which is expressed by a formula "$f_3=2f_1-f_2$", by means of a non-linear optical phenomenon; and
    causing the third light to pass through an optical filter having a pass wavelength range set such that a pulse time width of the third light is 20% or more narrower than a pulse time width of the first light after such passage through said optical filter, thereby obtaining a second light,
    wherein an absolute value of wavelength dispersion of said optical fiber is not larger than 0.2 ps/nm/km at the wavelength of the first light.

2. A wavelength conversion method in which an amplitude-modulated first light having an optical frequency $f_1$ is received and a second light having a wavelength different from a wavelength of the first light is output, the method comprising the steps of:
    multiplexing the first light and a reference light, the reference light being continuous light having a wavelength different from the wavelength of the first light and having an optical frequency $f_2$ and the first light having larger amplitude than the reference light;
    propagating the multiplexed first light and reference light through an optical fiber so as to generate a third light having a wavelength different from the wavelength of the first light and an optical frequency $f_3$, which is expressed by a formula "$f_3=2f_1-f_2$", by means of a non-linear optical phenomenon; and
    causing the third light to pass through an optical filter having a pass wavelength range set such that a cross point of an eye pattern of the third light is lower than a cross point of an eye pattern of the first light after such passage through said optical filter, thereby obtaining a second light,
    wherein an absolute value of wavelength dispersion of said optical fiber is not larger than 0.2 ps/nm/km at the wavelength of the first light.

3. A wavelength conversion method according to claim 1 or 2, wherein the pass wavelength range is adjustable by 10 nm or more with the wavelength shift control.

4. A wavelength conversion method according to claim 3, wherein a power variation of the second light in the wavelength shift control is not larger than 3 dB.

5. The wavelength conversion method according to claim 3, wherein the wavelength shift control is performed based on a wavelength shift of the reference light.

6. The wavelength conversion method according to claim 3, wherein the wavelength shift control is performed based on a wavelength shift of the first light.

7. A wavelength converter which receives an amplitude-modulated first light having an optical frequency $f_1$ and outputs a second light having a wavelength different from a wavelength of the first light, the converter comprising:

an optical multiplexer for multiplexing the first light and a reference light together, the reference light being a continuous light having a wavelength different from the wavelength of the first light and having an optical frequency $f_2$ and the first light having larger amplitude than the reference light;

an optical fiber for propagating the multiplexed first light and reference light therethrough so as to generate a third light having a wavelength different from the wavelength of the first light and an optical frequency $f_3$, which is expressed by a formula "$f_3=2f_1-f_2$", by means of a non-linear optical phenomenon; and an optical filter allowing the third light to pass therethrough and having a pass wavelength range set such that a pulse time width of the third light is 20% or more narrower than a pulse time width of the first light after such passage through said optical filter, wherein an absolute value of wavelength dispersion of said optical fiber is not larger than 0.2 ps/nm/km at the wavelength of the first light.

8. A wavelength converter which receives an amplitude-modulated first light having an optical frequency $f_1$ and outputs a second light having a wavelength different from a wavelength of the first light, the converter comprising:

an optical multiplexer for multiplexing the first light and reference light together, the reference light being continuous light having a wavelength different from the wavelength of the first light and having an optical frequency $f_2$ and the first light having larger amplitude than the reference light;

an optical fiber for propagating the multiplexed first light and reference light therethrough so as to generate a third light having a wavelength different from the wavelength of the first light and an optical frequency $f_3$, which is expressed by a formula "$f_3=2f_1-f_2$", by means of a non-linear optical phenomenon; and an optical filter allowing the third light to pass therethrough and having a pass wavelength range set such that a cross point of an eye pattern of the third light is lower than a cross point of an eye pattern of the first light after such passage through said optical filter, wherein an absolute value of wavelength dispersion of said optical fiber is not larger than 0.2 ps/nm/km at the wavelength of the first light.

9. The wavelength converter according to claim 7 or 8, wherein said optical filter is a wavelength variable optical filter.

10. The wavelength converter according to claim 7 or 8, wherein a non-linear coefficient of said optical fiber is not smaller than 10/W/km.

11. The wavelength converter according to claim 7 or 8, wherein a dispersion slope of said optical fiber is zero at a wavelength within the C band or the L band.

* * * * *